United States Patent
Marechal et al.

(10) Patent No.: US 9,440,630 B2
(45) Date of Patent: Sep. 13, 2016

(54) PNEUMATIC BRAKE DISTRIBUTOR VALVE ASSEMBLY FOR A RAIL VEHICLE

(71) Applicant: FAIVELEY TRANSPORT AMIENS, Amiens (FR)

(72) Inventors: Mickael Marechal, Hem Hardinval (FR); Gilbert Le Gall, Amiens (FR)

(73) Assignee: FAIVELEY TRANSPORT AMIENS, Amiens (FR)

( * ) Notice: Subject to any disclaimer, the term of this patent is extended or adjusted under 35 U.S.C. 154(b) by 0 days.

(21) Appl. No.: 14/650,810

(22) PCT Filed: Dec. 10, 2013

(86) PCT No.: PCT/FR2013/053017
§ 371 (c)(1),
(2) Date: Jun. 9, 2015

(87) PCT Pub. No.: WO2014/091142
PCT Pub. Date: Jun. 19, 2014

(65) Prior Publication Data
US 2015/0307074 A1  Oct. 29, 2015

(30) Foreign Application Priority Data
Dec. 10, 2012  (FR) ..................................... 12 61850

(51) Int. Cl.
*B60T 15/42*  (2006.01)
*B60T 15/02*  (2006.01)

(52) U.S. Cl.
CPC .............. *B60T 15/021* (2013.01); *B60T 15/42* (2013.01)

(58) Field of Classification Search
CPC .... B60T 13/665; B60T 15/02; B60T 15/021; B60T 15/42

USPC .......................... 303/7, 8, 33, 38, 44, 71, 82
See application file for complete search history.

(56) References Cited

U.S. PATENT DOCUMENTS

| 2,103,352 A | * | 12/1937 | Farmer | ................ B60T 15/048 251/47 |
| 4,025,125 A | * | 5/1977 | Wickham | ................ B60T 15/42 303/33 |

(Continued)

FOREIGN PATENT DOCUMENTS

| EP | 0 001 131 A1 | 3/1979 |
| EP | 0 070 405 A1 | 1/1983 |

(Continued)

OTHER PUBLICATIONS

U.S. Appl. No. 14/650,793, filed Jun. 9, 2015.
(Continued)

*Primary Examiner* — Christopher Schwartz
(74) *Attorney, Agent, or Firm* — Young & Thompson

(57) ABSTRACT

A pneumatic brake valve unit for a rail vehicle, includes: a main device (20) that selectively controls a communication path between a brake pipe connector (18) and either an atmospheric exhaust line (19) or an auxiliary reservoir connector (16), such that the pressure at the brake pipe connector (18) is k times the difference between the pressure at a control reservoir connector (14) and the pressure at a main brake pipe connector (12), k being a proportionality factor; a cut-off valve (21) that controls a communication path between the main brake pipe connector (12) and the control reservoir connector (14); an accelerator device (22) that controls a communication path between the main brake pipe connector (12) and an air discharge member (19); and a driving pilot (39) which is common to both the valve (21) and the accelerator device (22) and which controls their respective communication paths.

16 Claims, 4 Drawing Sheets

(56) References Cited

U.S. PATENT DOCUMENTS

| | | | | |
|---|---|---|---|---|
| 4,063,784 A | * | 12/1977 | Pick | B60T 15/22 303/36 |
| 4,103,976 A | * | 8/1978 | Pick | B60T 17/18 303/38 |
| 4,106,819 A | | 8/1978 | Hart | |
| 4,480,875 A | | 11/1984 | Huber | |
| 4,536,039 A | * | 8/1985 | Barberis | B60T 13/665 303/16 |
| 4,564,245 A | * | 1/1986 | Barberis | B60T 13/683 303/15 |
| 4,653,812 A | * | 3/1987 | Engle | B60T 8/1837 303/22.2 |
| 4,773,713 A | * | 9/1988 | Rojecki | B60T 11/34 303/33 |
| 4,848,849 A | | 7/1989 | Epp et al. | |
| 4,854,648 A | * | 8/1989 | Nakao | B60T 15/42 303/69 |
| 8,794,717 B2 | * | 8/2014 | Call | B60T 15/041 303/28 |
| 2015/0344015 A1 | * | 12/2015 | Marechal | B60T 15/021 303/33 |

FOREIGN PATENT DOCUMENTS

| | | |
|---|---|---|
| EP | 0 328 755 A1 | 8/1989 |
| FR | 2 731 192 A1 | 9/1996 |

OTHER PUBLICATIONS

International Search Report, dated Jul. 14, 2014, from corresponding PCT application.

* cited by examiner

PNEUMATIC BRAKE DISTRIBUTOR VALVE ASSEMBLY FOR A RAIL VEHICLE

The invention relates to rail vehicle braking.

It is known that rail vehicle braking is conventionally actuated pneumatically using distributor valve assemblies actuating braking devices. In a train, the braking commands are communicated to the distributor valve assemblies by a pipe that runs along the train. This pipe is called the train brake pipe.

Pneumatic brake distributor valve assemblies for rail vehicles are already known, that comprise:
- a brake cylinder pipe connector to connect to a brake cylinder pipe provided to be linked to a braking device configured to provide braking of an intensity according to the pressure in the brake cylinder pipe, braking having not to be carried out when the pressure in the brake cylinder pipe is atmospheric pressure, braking having to be carried out when the pressure in the brake cylinder pipe is greater than atmospheric pressure;
- a train brake pipe connector to connect to a train brake pipe provided to be brought to a pressure of which the difference relative to a reference pressure represents the intensity of braking to perform, braking having not to be carried out when the pressure in the train brake pipe is similar to said reference pressure, braking having to be carried out when the pressure in the train brake pipe is less than said reference pressure;
- a control reservoir connector to connect to a control reservoir provided to be brought to said reference pressure;
- an auxiliary reservoir connector to connect to an auxiliary reservoir provided to store compressed air;
- a main device in fluidic connection with said brake cylinder pipe connector, said train brake pipe connector, said control reservoir connector, said auxiliary reservoir connector and an exhaust to atmosphere, said main device being configured to selectively actuate a communication path between said brake cylinder pipe connector and either said exhaust or said auxiliary reservoir connector, according to the pressure at said train brake pipe connector and the pressure at said control reservoir connector, in order for the pressure at the brake cylinder pipe connector to be k times the difference between the pressure at the control reservoir connector and the pressure at the train brake pipe connector, k being a pre-set ratio of proportionality, in general of the order of 2.53 (3.8/1.5); and
- a cut-off valve in fluidic connection with said brake cylinder pipe connector, said train brake pipe connector and said control reservoir connector, said cut-off valve being configured to selectively actuate a communication path between said train brake pipe connector and said control reservoir connector, between a closed position and an open position, said path being in open position when the pressure at said brake cylinder pipe connector is atmospheric pressure and in closed position when the pressure at said brake cylinder pipe connector is greater than atmospheric pressure.

It should be noted that certain distributor valve assemblies of the aforementioned type are provided in order for the brake cylinder pipe to be linked directly to the braking device. Other distributor valve assemblies of the aforementioned type are provided in order for the brake cylinder pipe to be linked to the braking device via a pneumatic relay, the brake cylinder pipe being connected at one end to the brake cylinder pipe connector of the distributor valve assembly while at the other end it is connected to an inlet connector of the pneumatic relay; another pipe being connected at one end to the outlet connector of the pneumatic relay and at the other end to the braking device. Such a brake cylinder pipe is in general called a dummy brake cylinder pipe.

In the present specification, the expression "brake cylinder pipe" refers equally to a pipe to connect directly to a braking device and to a pipe to connect to a braking device via a pneumatic relay.

In general, in the aforementioned pneumatic distributor valve assemblies, the cut-off valve serves to place the control reservoir and the train brake pipe in communication when braking must not be carried out. This is how the control reservoir is able to fill when the train starts and then, when braking must not be carried out, the pressure in the control reservoir follows the pressure of the train brake pipe. When braking must be carried out, the cut-off valve closes the communication path between the train brake pipe and the control reservoir, such that the pressure in the control reservoir is maintained and may then constitute the reference pressure in relation to which the pressure in the train brake pipe has become less.

As indicated above, the difference between the pressure in the train brake pipe and the reference pressure represents the intensity of the braking to be carried out.

The role of the main device is to provide to the brake cylinder pipe connector a pressure k time that difference, k being a pre-set ratio of proportionality, in general 2.53 (3.8/1.5).

Indeed, in general:
- when braking must not be carried out, the pressure in the train brake pipe is of the order of 5 bars and the pressure in the brake cylinder pipe is atmospheric pressure; and
- when braking of maximum intensity is to be carried out, the pressure in the train brake pipe is of the order of 3.5 bars and the pressure in the brake cylinder pipe is of the order of 3.8 bars.

The ratio of proportionality k is pre-set in order for the amplitude of pressure variation in the brake cylinder pipe (amplitude of 3.8 bars) to correspond to the amplitude of pressure variation in the train brake pipe (amplitude of 5-3.5=1.5 bar).

Of course, in the present specification, as is conventional in pneumatics, the pressures concerned are relative pressures, that is to say that the value of the pressures is the difference relative to atmospheric pressure.

In practice, to avoid minimal reductions in the pressure in the train brake pipe triggering braking, the distributor valve assemblies of the aforementioned type are provided to supply pressure to the brake cylinder pipe connector only if the pressure at the train brake pipe connector reduces in a predetermined manner.

For example, the standard EN15355 specifies that the distributor valve assembly:
- must not supply pressure to the brake cylinder pipe connector when the pressure at the train brake pipe connector reduces by less than 0.3 bar in 60 seconds starting from the pressure of approximately 5 bars corresponding to a command of absence of braking; and
- must supply a pressure to the brake cylinder pipe connector when the pressure at the train brake pipe connector reduces by at least 0.6 bar in 6 seconds starting from the pressure of approximately 5 bars corresponding to a command of absence of braking, the pressure at the brake cylinder pipe connector having to be supplied at latest 1.2 seconds after the start of the reduction in pressure at the train brake pipe connector.

In the present specification, it is understood that this insensitivity to minimal reductions in pressure at the train brake pipe connector is covered by the statements that the pressure at the brake cylinder pipe connector is k times the difference between the pressure at the control reservoir connector and the pressure at the train brake pipe connector.

As regards the cut-off valve, in practice the communication path between the train brake pipe connector and the control reservoir connector is in open or closed position when the reduction in pressure at the train brake pipe connector or the pressure at the brake cylinder pipe connector attains certain predetermined thresholds.

For example, the standard EN15355 specifies that the path between the train brake pipe connector and the control reservoir connector:

must be open when the reduction in pressure at the train brake pipe connector is less than 0.15 bar; and must be closed when the pressure at the brake cylinder pipe connector is greater than or equal to 0.3 bar.

In the present specification, it is understood that these threshold effects are covered by the statements that the communication path between the train brake pipe connector and the control reservoir connector is in open position when the pressure at the brake cylinder pipe connector is atmospheric pressure, and in closed position when the pressure at the brake cylinder pipe connector is greater than atmospheric pressure.

Still with regard to the cut-off valve, the open or closed position of the communication path between the train brake pipe connector and the control reservoir connector depends:

in certain distributor valve assemblies, solely on the pressure at the brake cylinder pipe connector; or in other distributor valve assemblies, both on the pressure at the brake cylinder pipe connector and on the difference between the pressure at the control reservoir connector and the pressure at the train brake pipe connector (in the latter case, the communication path is in open position when the pressure at the brake cylinder pipe connector is atmospheric pressure and the pressure at the control reservoir connector and the pressure at the train brake pipe connector are similar; and otherwise the path is in closed position).

In the present specification, it is understood that these two possibilities are covered by the statements that the communication path between the train brake pipe connector and the control reservoir connector is in open position when the pressure at the brake cylinder pipe connector is atmospheric pressure, and in closed position when the pressure at the brake cylinder pipe connector is greater than atmospheric pressure.

To accelerate the propagation of a braking command along the train brake pipe, certain recent distributor valve assemblies comprise a quick service device in fluidic connection with said brake cylinder pipe connector, said train brake pipe connector, said control reservoir connector and an exhaust to atmosphere, said quick service device being configured to selectively actuate a communication path between said train brake pipe connector and said exhaust to atmosphere, between a closed position and an open position, said path being in closed position except when the pressure at said train brake pipe connector becomes less than the pressure at said control reservoir connector while the pressure at said brake cylinder pipe connector is still atmospheric pressure.

Thus, between the time at which a difference has started to exist between the pressure at the control reservoir connector and the pressure at the train brake pipe connector and the time at which the main device has begun to supply to the brake cylinder pipe connector a pressure k times that difference, the train brake pipe is placed at atmospheric pressure by the quick service device.

This results in a local reduction in the pressure in the train brake pipe, which promotes the propagation of the braking command to the next distributor valve assembly linked to the train brake pipe.

A locking valve of such a quick service device is described by French patent application 2 731 192. This locking valve forms part of a distributor valve assembly in which the cut-off valve comprises a communication path of which the open or closed position depends both upon the pressure at the brake cylinder pipe connector and upon the difference between the pressure at the control reservoir connector and the pressure at the train brake pipe connector.

Thus, in this distributor valve assembly, the communication path between the train brake pipe connector and the control reservoir connector is closed when the pressure at the control reservoir connector is greater than the pressure at the train brake pipe connector. Therefore, at the time the train is parked or is braking in emergency, the control reservoir does not exhaust whereas the train brake pipe does exhaust.

When the train starts again, the situation arises in which the pressure at the control reservoir connector is higher than the pressure at the train brake pipe connector (the train brake pipe is then at atmospheric pressure), and therefore the communication path of the quick service device (between the train brake pipe connector and the exhaust) is open. The locking valve of the quick service device makes it possible to close that communication path when the train starts again, in order that the rise in pressure of the train brake pipe can take place.

The invention aims to provide a distributor valve assembly of the aforementioned type which is particularly simple, and economic.

To that end the invention provides a pneumatic brake distributor valve assembly for a rail vehicle, comprising:

a brake cylinder pipe connector to connect to a brake cylinder pipe provided to be linked to a braking device configured to provide braking of an intensity according to the pressure in the brake cylinder pipe, braking having not to be carried out when the pressure in the brake cylinder pipe is atmospheric pressure, braking having to be carried out when the pressure in the brake cylinder pipe is greater than atmospheric pressure;

a train brake pipe connector to connect to a train brake pipe provided to be brought to a pressure of which the difference relative to a reference pressure represents the intensity of braking to perform, braking having not to be carried out when the pressure in the train brake pipe is similar to said reference pressure, braking having to be carried out when the pressure in the train brake pipe is less than said reference pressure;

a control reservoir connector to connect to a control reservoir provided to be brought to said reference pressure;

an auxiliary reservoir connector to connect to an auxiliary reservoir provided to store compressed air;

a main device in fluidic connection with said brake cylinder pipe connector, said train brake pipe connector, said control reservoir connector, said auxiliary reservoir connector and an exhaust to atmosphere, said main device being configured to selectively actuate a communication path between said brake cylinder pipe connector and either said exhaust or said auxiliary reservoir connector, according to the pressure at said train brake pipe connector and the pressure at said control reservoir connector, in order for the pressure at the brake cylinder pipe connector to be k times the difference between the pressure at the control reservoir connector and the pressure at the train brake pipe connector, k being a pre-set ratio of proportionality;

a cut-off valve in fluidic connection with said brake cylinder pipe connector, said train brake pipe connector and said control reservoir connector, said cut-off valve being configured to selectively actuate a communication path between said train brake pipe connector and said control reservoir connector, between a closed position and an open position, said path being in open position when the pressure at said brake cylinder pipe connector is atmospheric pressure and in closed position when the pressure at said brake cylinder pipe connector is greater than atmospheric pressure; and a quick service device in fluidic connection with said brake cylinder pipe connector, said train brake pipe connector, said control reservoir connector and an air evacuating member, said quick service device being configured to selectively actuate a communication path between said train brake pipe connector and said air evacuating member, between a closed position and an open position, said path being in open position when the pressure at said train brake pipe connector becomes less than the pressure at said control reservoir connector while the pressure at said brake cylinder pipe connector is still at atmospheric pressure, said path otherwise being in closed position;

characterized in that said distributor valve assembly comprises a driver common to said cut-off valve and to said quick service device, in fluidic connection with said brake cylinder pipe connector, said common driver being configured to actuate both said communication path of said quick service device and said communication path of said cut-off valve.

Whereas in the known distributor valve assemblies, the cut-off valve and the quick service device are independent, each having its own driver in fluidic connection with the brake cylinder pipe connector, in the distributor valve assembly according to the invention, the cut-off valve and the quick service device are grouped together, with the common driver actuating both the communication path of the quick service device and the communication path of the cut-off valve.

This enables the pneumatic distributor valve assembly according to the invention to be particularly compact and economic.

What is more, the synergy between the cut-off valve and the quick service device on account of sharing the driver is favorable to the implementation of the distributor valve assembly.

According to preferred features of implementation of the cut-off valve, the latter comprises the common driver and a fluidic actuating member, called cut-off actuating member below, in fluidic connection with said train brake pipe connector and said control reservoir connector, said cut-off actuating member having a resting position in which it opens said communication path between the train brake pipe connector and the control reservoir connector, and having a working position in which it closes said communication path between the train brake pipe connector and the control reservoir connector, said common driver leaving said cut-off actuating member in its resting position when the pressure at said brake cylinder pipe connector is atmospheric pressure and driving said cut-off actuating member into its working position when the pressure at said brake cylinder pipe connector is greater than atmospheric pressure.

Preferably, said cut-off valve comprises exclusively said common driver and said cut-off actuating member.

Thus, the communication path of the cut-off valve depends solely upon the pressure at the brake cylinder pipe connector (and not, as in certain earlier distributor valve assemblies mentioned above, upon both the pressure at the brake cylinder pipe connector and the difference between the pressure at the control reservoir connector and the pressure at the train brake pipe connector). Thus, the distributor valve assembly according to the invention does not require a locking valve of the quick service device as described by the aforementioned French patent application 2 731 192.

These features thus enable the distributor valve assembly according to the invention to be particularly compact, simple and economic.

According to preferred features of implementation of the quick service device, the latter comprises a first fluidic actuating member, below called first quick service actuating member, a second fluidic actuating member, below called second quick service actuating member, said common driver and another driver;

said first quick service actuating member being in fluidic connection with said train brake pipe connector and said second quick service actuating member, and having a resting position in which said train brake pipe connector is in fluidic communication with said second quick service actuating member and a working position in which said train brake pipe connector is isolated from said second quick service actuating member, said common driver leaving said first quick service actuating member in its resting position when the pressure at said brake cylinder pipe connector is atmospheric pressure and driving said first quick service actuating member into its working position when the pressure at said brake cylinder pipe connector is greater than atmospheric pressure;

said second quick service actuating member being in fluidic connection with said first quick service actuating member and said air evacuating member, said second quick service actuating member having a resting position in which said first quick service actuating member is isolated from said air evacuating member and a working position in which said first quick service actuating member is in fluidic communication with said air evacuating member, said other driver leaving said second quick service actuating member in its resting position when the pressure at said train brake pipe connector is equal to the pressure at said control reservoir connector and driving said second quick service actuating member into its working position when the pressure at said train brake pipe connector is less than the pressure at said control reservoir.

Preferably, said other driver is common to said quick service device and to said main device, said other common driver being configured to actuate both said communication path of said quick service device and said communication path of the main device.

The quick service device is thus exclusively actuated by shared drivers.

These features thus enable the distributor valve assembly according to the invention to be implemented in a particularly compact, simple and economic manner.

According to preferred features, that promote the proper operation of the distributor valve assembly according to the invention, the latter is configured such that, when braking is required to stop being carried out, the second quick service actuating member passes from its working position to its resting position before the first quick service actuating member passes from its working position to its resting position.

According to other features that are preferred as being favorable to the compactness and convenience of manufacture of the distributor valve assembly according to the invention:

said cut-off actuating member is implemented by a first chamber in fluidic connection with the train brake pipe connector, by a second chamber in fluidic connection with the control reservoir connector, by a cut-off seat delimiting an opening for fluidic communication between the first chamber and the second chamber, by a cut-off actuating piston movable between a position in which it is away from said cut-off seat and a position in which it is in contact with said cut-off seat and closes said opening for fluidic communication between the first chamber and the second chamber, as well as by a return spring biasing said cut-off actuating piston towards said cut-off seat;

said first quick service actuating member is implemented by said first chamber, by a third chamber, that is contiguous with said first chamber, on the opposite side to the second chamber, by a first quick service actuating member seat delimiting an opening for fluidic communication between the first chamber and the third chamber, by a first quick service actuating member piston which is movable between a position in which it is away from said first quick service actuating member seat and a position in which it is in contact with said first quick service actuating member seat and closes said opening for fluidic communication between the first chamber and the third chamber by a return spring biasing said first quick service actuating member piston towards said first quick service actuating member seat, as well as by a rod joined to said first quick service actuating member piston, which rod is configured for the first quick service actuating member piston and said rod to be pushed away from the first quick service actuating member seat by the cut-off actuating piston when it is away from said cut-off seat; and/or said common driver is implemented by a fourth chamber in fluidic connection with said brake cylinder pipe connector, said fourth chamber being contiguous with said second chamber, on the opposite side to said first chamber, by a fifth chamber at atmospheric pressure, by a common driver piston comprising a face turned towards said fourth chamber and, on the opposite side, a face turned towards the fifth chamber, by a return spring biasing said common driver piston towards said fourth chamber, as well as by a rod joined to said common driver piston, said rod joined to the common driver piston pushing said cut-off actuating piston in said position in which it is away from the cut-off seat when the pressure at said brake cylinder pipe connector is atmospheric pressure, said rod joined to the common driver piston letting said cut-off actuating piston come into contact with the cut-off seat when the pressure at said brake cylinder pipe connector is greater than atmospheric pressure.

According to other preferred features, the distributor valve assembly according to the invention comprises a constriction between said brake cylinder pipe connector and said common driver.

This constriction is useful for setting the period during which the communication path of the quick service device remains in open position.

According to other advantageous features, said air evacuating member with which said quick service device is in fluidic connection is an exhaust to atmosphere; and for example said air evacuating member with which the quick service device is in connection is also the exhaust to atmosphere with which the main device is in fluidic connection.

The disclosure of the invention will now be continued with the description of an example embodiment, given below by way of illustrative and non-limiting example, with reference to the accompanying drawings, in which.

Figure 2:
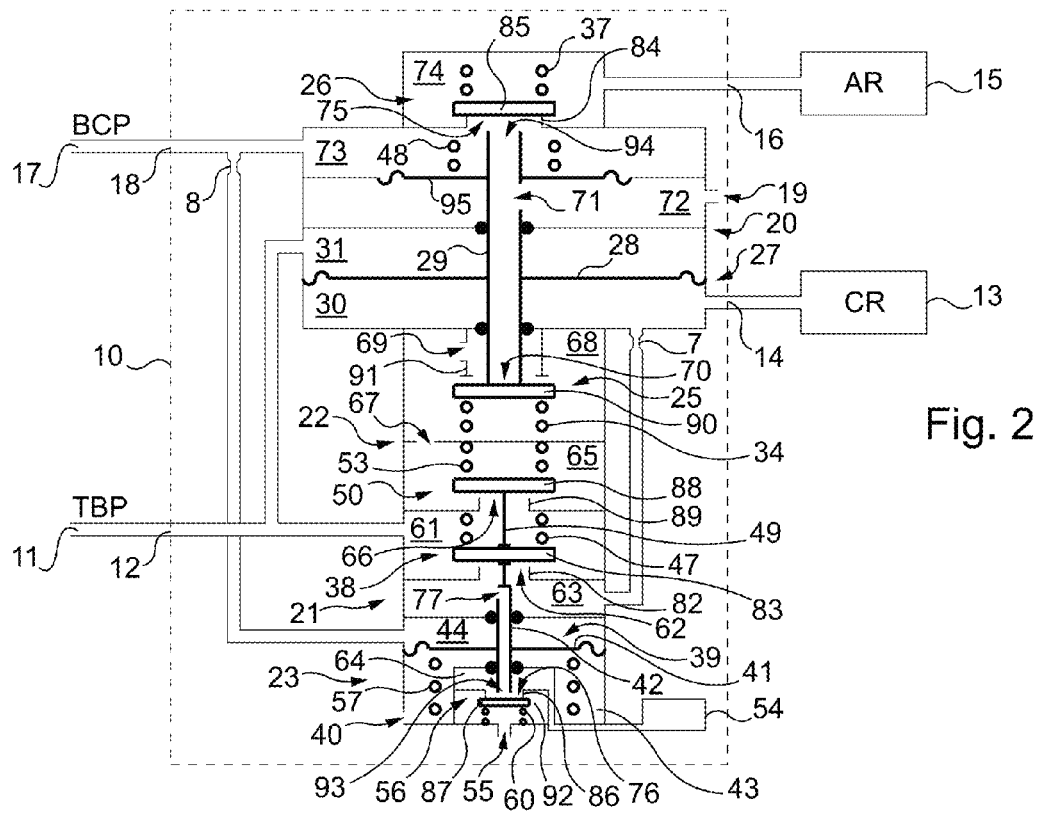
FIG. 2 is a diagrammatic view in cross-section of that distributor valve assembly, in resting configuration as in FIG. 1.
Figure 3:
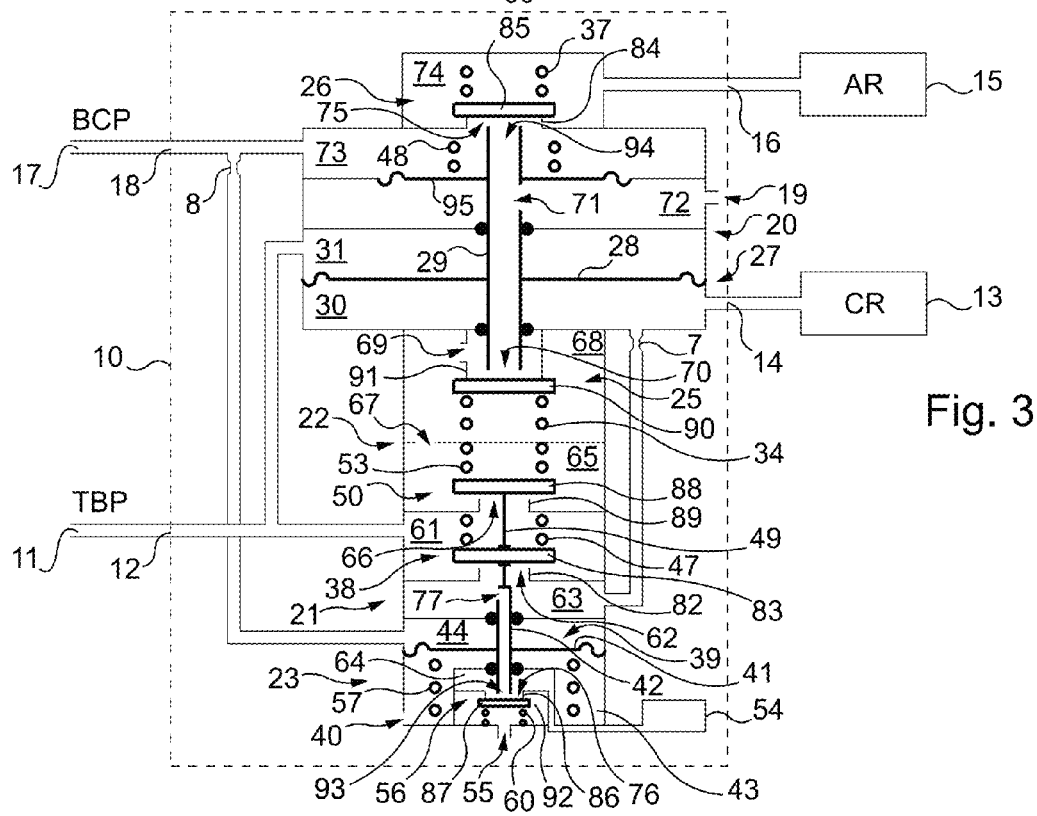
Figure 4:
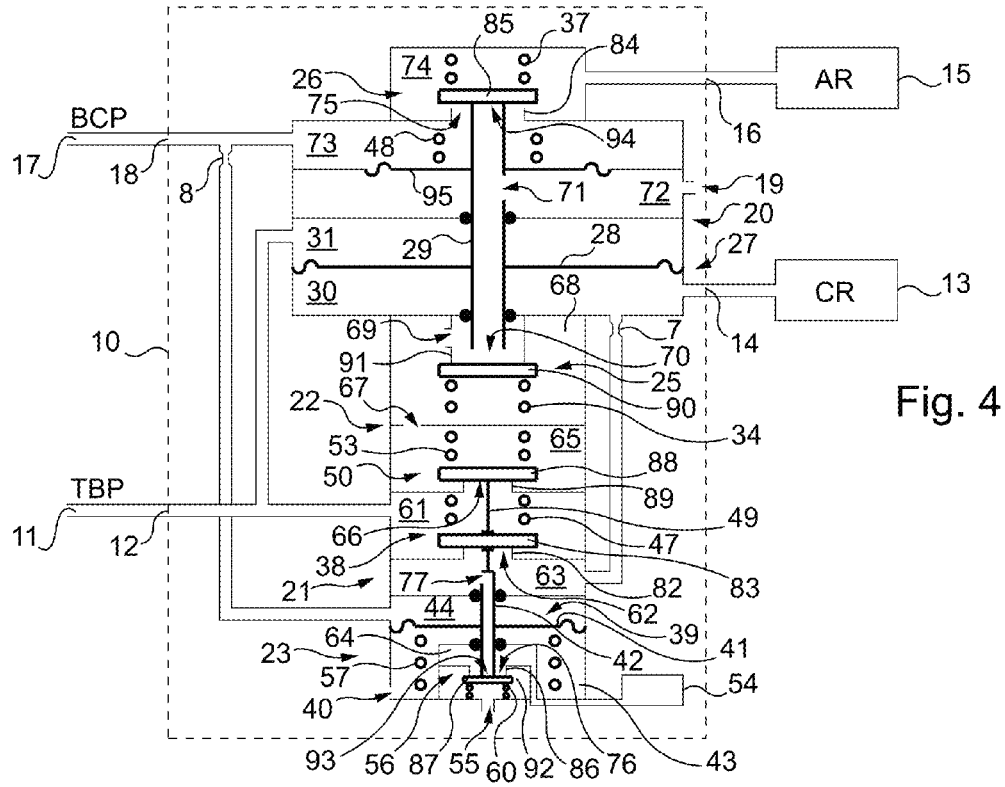
Figure 5:
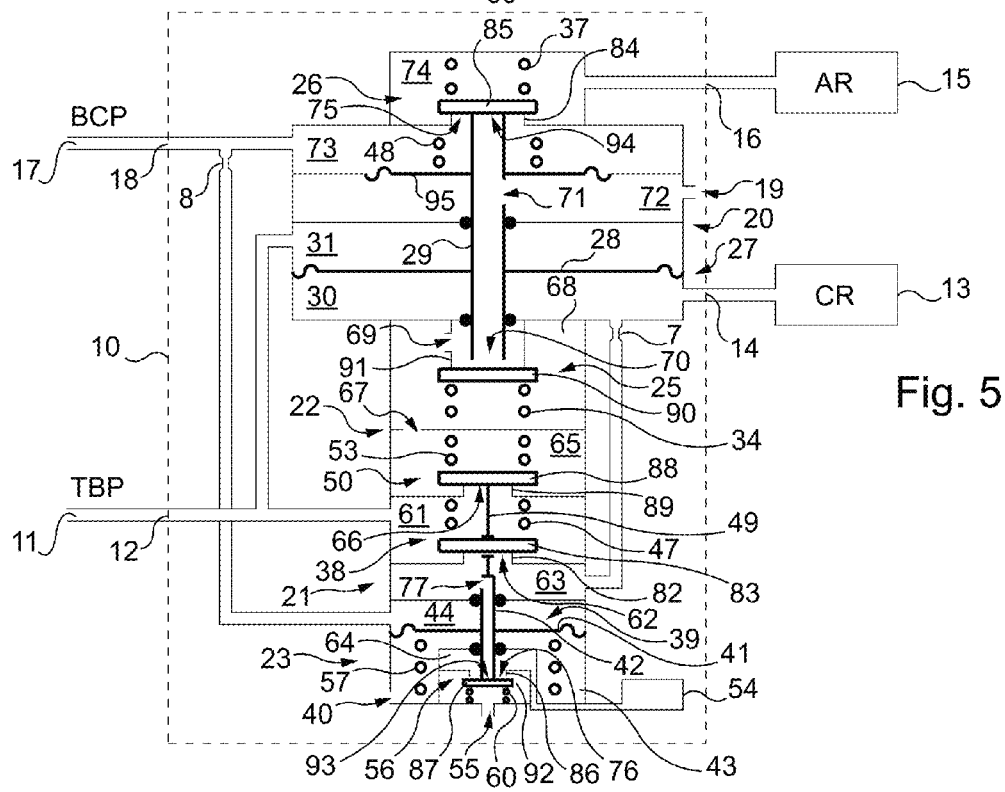
Figure 6:
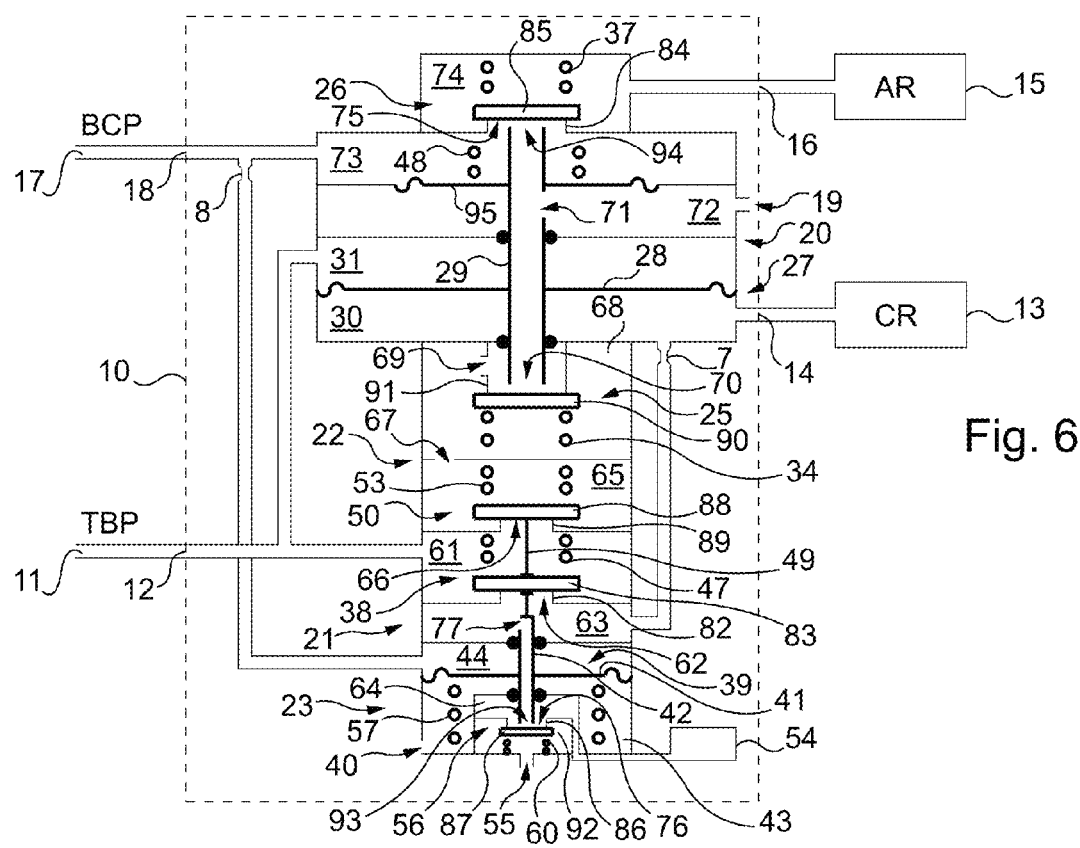

FIGS. 3 and 4 are similar views to FIG. 2, respectively showing the configuration taken by the distributor valve assembly just after the pressure at the train brake pipe connector has become less than the pressure at the control reservoir connector and in a configuration which the distributor valve assembly then takes; and FIGS. 5 and 6 are similar views to FIGS. 2 to 4, respectively in a configuration which the distributor valve assembly takes when braking is being performed and the pressure at the train brake pipe connector is stable and in a configuration which the distributor valve assembly then takes just after the pressure at the train brake pipe connector has become similar to the pressure at the control reservoir connector.

Figure 1:
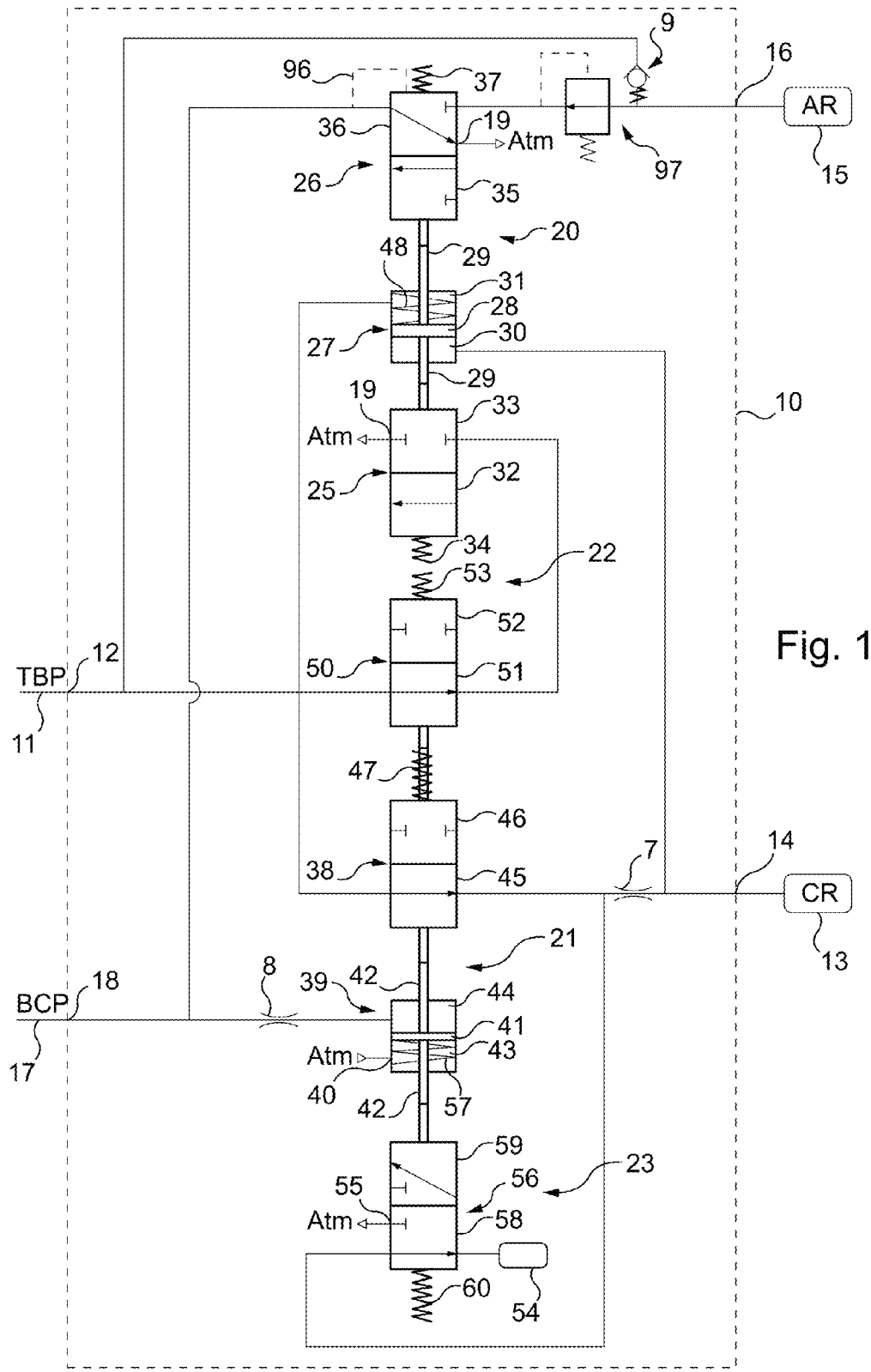
FIG. 1 is an illustration, in the form of a pneumatic circuit, of a braking distributor valve assembly for a rail vehicle in accordance with the invention.

The pneumatic distributor valve assembly 10 illustrated in FIG. 1 is provided to be connected to a train brake pipe 11 by a train brake pipe connector 12, to a control reservoir 13 by a control reservoir connector 14, to an auxiliary reservoir 15 by an auxiliary reservoir connector 16 and to a brake cylinder pipe 17 by a brake cylinder pipe connector 18.

The brake cylinder pipe 17 is provided to be connected to a braking device (not illustrated) configured to provide braking at an intensity according to the pressure inside the brake cylinder pipe 17, braking having not to be carried out when the pressure in the brake cylinder pipe 17 is atmospheric pressure, braking having to be carried out when the pressure in the brake cylinder pipe 17 is greater than atmospheric pressure.

It is to be recalled here that in the present specification, the expression "brake cylinder pipe" refers equally to a pipe to connect directly to a braking device and to a pipe to connect to a braking device via a pneumatic relay.

The train brake pipe 11 is provided to be brought to a pressure of which the difference relative to a reference pressure, supplied by the control reservoir 13, represents the intensity of the braking to be carried out, braking having not to be carried out when the pressure in the train brake pipe is similar to the reference pressure (pressure in the control reservoir 13), braking having to be carried out when the pressure in the train brake pipe 11 is less than that reference pressure.

The distributor valve assembly 10 comprises a fluidic communication path between the train brake pipe connector 12 and the auxiliary reservoir connector 16, that path comprising a check valve 9 passing in the direction from train brake pipe connector 12 to auxiliary reservoir connector 16 and checking in the opposite direction.

This communication path enables the compressed air from the train brake pipe 11 to fill the auxiliary reservoir 15, without the reservoir 15 emptying towards the train brake pipe 11 when the pressure thereof becomes less than the pressure in the auxiliary reservoir 15.

In FIGS. 2 to 6, the check valve 9 is not shown in the interest of simplification.

The distributor valve assembly 10 further comprises a main device 20, a cut-off valve 21, a quick service device 22 and a resetting device 23.

The main device 20 is in fluidic connection with the train brake pipe connector 12, control reservoir connector 14, auxiliary reservoir connector 16, brake cylinder pipe connector 18 as well as with an exhaust to atmosphere 19.

In the connection between the main device 20 and the auxiliary reservoir connector 16, there is provided a pressure reducing valve 97 which serves to regulate the pressure on the side to the main device 20.

Here, the store of compressed air contained by the auxiliary reservoir 15, which comes from the train brake pipe 11, is at a pressure of approximately 5 bars, whereas the maximum pressure to which the brake cylinder pipe 17 must be brought is of the order of 3.8 bars. The pressure reducing valve 97 serves to supply the main device 20 with air from the auxiliary reservoir 15 at a pressure of approximately 3.8 bars.

In FIGS. 2 to 6, the pressure reducing valve 97 is not shown in the interest of simplification.

The main device 20 is configured to selectively actuate a communication path between the brake cylinder pipe connector 18 and either the exhaust 19 or the auxiliary reservoir connector 16.

The main device 20 comprises a fluidic actuating member 26, below called main actuating member, and a driver 27, hereinafter termed main driver.

The main driver 27 is in fluidic connection with the train brake pipe connector 12 and control reservoir connector 14. The driver 27 comprises a piston 28, a rod 29, two chambers 30 and 31 and a return spring 48 biasing the piston 28 towards the chamber 30, that is to say downward in FIG. 1.

The piston 28 comprises, on the side that can be seen upward in FIG. 1, a face turned towards the chamber 31 and, on the opposite side, that is to say on the side which can be seen downward in FIG. 1, a face turned towards the chamber 30.

The rod 29 is joined to the piston 28 and extends on each side thereof.

The chamber 30 is in fluidic connection with the control reservoir connector 14. The chamber 31 is in fluidic connection with the train brake pipe connector 12.

The driver 27, and more specifically its piston 28 and its rod 29, take a position according to the pressure at the train brake pipe connector 12 and the pressure at the control reservoir connector 14. When the pressure at the train brake pipe connector 12 is similar to the pressure at the control reservoir connector 14 the driver 27 is in the resting position illustrated in FIG. 1. When the pressure at the train brake pipe connector 12 becomes less than the pressure at the control reservoir connector 14 the piston 28 and the rod 29 move towards the top of FIG. 1 to take a working position.

The greater the difference between the pressure at the control reservoir connector 14 and the pressure at the train brake pipe connector 12, the further the piston 28 and the rod 29 move upward.

The end of the rod 29 which can be seen at the top in FIG. 1 bears against the main actuating member 26.

The main actuating member 26 is in fluidic connection with the auxiliary reservoir connector 16, the brake cylinder pipe connector 18 and the exhaust to atmosphere 19.

The main actuating member 26 comprises a feedback loop 96 and a return spring 37 and has two extreme operating positions, a resting position 36 and a working position 35.

The return spring 37 of the main actuating member 26 enables the latter to return to its resting position 36 when the driver 27 returns to its resting position. The return spring 37 acts in the same direction as the return spring 48 of the driver 27.

When the main actuating member 26 is in resting position 36, a communication path is established between the brake cylinder pipe connector 18 and the exhaust to atmosphere 19.

When the main actuating member 26 is in working position 35, a communication path is established between the brake cylinder pipe connector 18 and the auxiliary reservoir connector 16.

Thus, the working position 35 enables the pressure to be increased at the brake cylinder pipe connector 18 whereas the resting position 36 enables the pressure to be reduced at the brake cylinder pipe connector 18.

In addition to the driver 27 and the spring 37, the main actuating member 26 is subjected to the influence of the pressure at the brake cylinder pipe connector 18, as is illustrated diagrammatically in FIG. 1 by the feedback loop 96.

The driver 27 and the actuating member 26 are configured in order for the pressure at the brake cylinder pipe connector 18 to be k times the difference between the pressure at the control reservoir connector 14 and the pressure at the train brake pipe connector 12, k being of the order of 2.53 (3.8/1.5).

It is to be recalled here that in the present specification, it is understood that the insensitivity to minimal reductions in pressure at the train brake pipe connector is covered by the statements that the pressure at the brake cylinder pipe connector is k times the difference between the pressure at the control reservoir connector and the pressure at the train brake pipe connector.

The driver 27 takes a position corresponding to that difference, which is the resting position when the pressure at the train brake pipe connector 12 is similar to the pressure at the control reservoir connector 14, and a working position when the pressure at the train brake pipe connector 12 is less than the pressure at the control reservoir connector 14.

By virtue of the feedback loop 96, the main actuating member 26 regulates the pressure at the brake cylinder pipe connector 18 according to the setting given by the position of the driver 27.

If the pressure at the brake cylinder pipe connector 18 is too low, the main actuating member 26 goes into the working position 35 to increase the pressure at the brake cylinder pipe connector 18. If the pressure at the brake cylinder pipe connector 18 is too high, the main actuating member 26 goes into the resting position 36 to reduce the pressure at the brake cylinder pipe connector 18. If the pressure at the brake cylinder pipe connector 18 corresponds to the setting, the main actuating member 26 goes into an intermediate position (not shown in FIG. 1 but described below with reference to FIG. 5) in which the brake cylinder pipe connector 18 is isolated both from the exhaust 19 and from the auxiliary reservoir connector 16.

A description will now be given of the cut-off valve 21.

The cut-off valve 21 is in fluidic connection with the train brake pipe connector 12, the control reservoir connector 14 and the brake cylinder pipe connector 18.

The cut-off valve 21 is configured to selectively actuate a communication path between the train brake pipe connector 12 and the control reservoir connector 14.

The cut-off valve 21 comprises a fluidic actuating member 38, below called cut-off actuating member, and a driver 39, hereinafter termed cut-off driver.

The cut-off driver 39 is in fluidic connection with the brake cylinder pipe connector 18 and an opening 40 to atmosphere. The driver 39 comprises a piston 41, a rod 42, two chambers 43 and 44 and a return spring 57 biasing the piston 41 towards the chamber 44, that is to say upward in FIG. 1.

The piston 41 comprises, on the side that can be seen upward in FIG. 1, a face turned towards the chamber 44 and, on the opposite side, that is to say on the side which can be seen downward in FIG. 1, a face turned towards the chamber 43.

The rod 42 is joined to the piston 41 and extends on each side thereof.

The chamber 44 is in fluidic connection with the brake cylinder pipe connector 18. The chamber 43 is at atmospheric pressure by opening 40.

The driver 39, and more specifically its piston 41 and its rod 42, take a position according to the pressure at the brake cylinder pipe connector 18. When the pressure at the brake cylinder pipe connector 18 is atmospheric pressure, the driver 39 is in the resting position illustrated in FIG. 1. When the pressure at the brake cylinder pipe connector 18 becomes greater than atmospheric pressure the piston 41 and the rod 42 move downward in FIG. 1 to take a working position.

It is to be recalled here that in the present specification, it is understood that the threshold effects are covered by the statements that the communication path between the train brake pipe connector and the control reservoir connector is in open position when the pressure at the brake cylinder pipe connector is atmospheric pressure, and in closed position when the pressure at the brake cylinder pipe connector is greater than atmospheric pressure.

The cut-off actuating member 38 is in fluidic connection with the train brake pipe connector 12 and the control reservoir connector 14.

The cut-off actuating member 38 comprises a return spring 47 and has two operating positions, a resting position 45 and a working position 46.

When the cut-off actuating member 38 is in resting position 45, the communication path between the train brake pipe connector 12 and the control reservoir connector 14 is open.

When the cut-off actuating member 38 is in working position 46, the communication path between the train brake pipe connector 12 and the control reservoir connector 14 is closed.

The change of operating positions is actuated by the driver 39. The cut-off actuating member 38 is in resting position 45 when the driver 39 is in resting position that is to say when the pressure at the brake cylinder pipe connector 18 is atmospheric pressure. The cut-off actuating member 38 is in working position 46 when the driver 39 is in working position, that is to say when the pressure at the brake cylinder pipe connector 18 has become greater than atmospheric pressure.

The end of the rod 42 which can be seen at the top in FIG. 1 bears against the main cut-off actuating member 38.

The return spring 47 of the cut-off actuating member 38 enables the latter to pass to its working position 46 when the driver 39 passes to its working position, i.e. when the pressure at the brake cylinder pipe connector 18 is greater than atmospheric pressure. The return spring 57 of the driver 39 enables the cut-off actuating member 38 to return to its resting position 45 when the driver 39 returns to its resting position, i.e. when the pressure at the brake cylinder pipe connector 18 is again equal to atmospheric pressure. The return spring 47 acts in the opposite direction to the return spring 57 of the driver 39.

The driver 39 and the actuating member 38 confer upon the cut-off valve 21 a resting position in which the communication path between the train brake pipe connector 12 and the control reservoir connector 14 is open, and a working position in which the communication path between the train brake pipe connector 12 and the control reservoir connector 14 is closed, according to the pressure in the brake cylinder pipe connector 18.

A description will now be given of the quick service device 22.

The quick service device 22 is in fluidic connection with the train brake pipe connector 12, control reservoir connector 14, brake cylinder pipe connector 18 and with the exhaust to atmosphere 19.

The quick service device 22 is configured to selectively actuate a communication path between the train brake pipe connector 12 and the exhaust to atmosphere 19.

The quick service device 22 comprises a first fluidic actuating member 50, below called first quick service actuating member, and a second fluidic actuating member 25, below called second quick service actuating member.

The first quick service actuating member 50 is in fluidic connection with the train brake pipe connector 12 and the second quick service actuating member 25, which is also in fluidic connection with the exhaust 19.

The first quick service actuating member 50 comprises a return spring 53 and has two operating positions, a resting position 51 and a working position 52.

The second quick service actuating member 25 comprises a return spring 34 and has two operating positions, a resting position 33 and a working position 32.

The communication path between the train brake pipe connector 12 and the exhaust to atmosphere 19 is closed either when the first actuating member 50 is in its working position 52 or when the second actuating member 25 is in its resting position 33.

The communication path between the train brake pipe connector 12 and the exhaust 19 is open when the first quick service actuating member 50 is in its resting position 51 and the second quick service actuating member 25 is in its working position 32.

The change in operating positions of the first quick service actuating member 50 is actuated by the driver 39. The first quick service actuating member 50 is in resting position 51 when the driver 39 is in resting position, that is to say when the pressure at the brake cylinder pipe connector 18 is atmospheric pressure. The first quick service actuating member 50 is in working position 52 when the driver 39 is in working position, that is to say when the pressure at the brake cylinder pipe connector 18 has become greater than atmospheric pressure.

The end of the cut-off actuating member 38 that can be seen at the top in FIG. 1 bears against the first quick service actuating member 50.

The return spring 53 of the first quick service member 50 enables the latter to pass to its working position 52 when the driver 39 passes to its working position, i.e. when the pressure at the brake cylinder pipe connector 18 is greater than atmospheric pressure. The return spring 57 of the driver 39 enables the first quick service actuating member 50 to return to its resting position 51 when the driver 39 returns to its resting position, i.e. when the pressure at the brake cylinder pipe connector 18 is again atmospheric pressure. The return spring 53 acts in the opposite direction to the return spring 57 of the driver 39.

The change in operating positions of the second quick service actuating member 25 is actuated by the driver 27. The second quick service actuating member 25 is in resting position 33 when the driver 27 is in resting position, that is to say when the pressure at the train brake pipe connector 12 is similar to the pressure at the control reservoir connector 14. The second quick service actuating member 25 is in working position 32 when the driver 27 is in working position, that is to say when the pressure at the train brake pipe connector 12 is less than the pressure at the control reservoir connector 14.

The end of the rod 29 which can be seen at the bottom in FIG. 1 bears against the quick service actuating member 25.

The return spring 34 of the second quick service actuating member 25 enables the latter to pass to its working position 32 when the driver 27 passes to its working position, i.e. when the pressure at the train brake pipe connector 12 is again less than the pressure at the control reservoir connector 14. The spring 48 of the driver 27 enables the second quick service actuating member 25 to return to its resting position 33 when the driver 27 returns to its resting position, i.e. when the pressure at the train brake pipe connector 12 is again similar to the pressure at the control reservoir connector 14. The return spring 34 acts in the opposite direction to the return spring 48 of the driver 27.

The driver 39 associated with the first quick service actuating member 50 and the driver 27 associated with the second quick service actuating member 25 confer upon the quick service device 22 a resting position in which the communication path between the train brake pipe connector 12 and the exhaust 19 is closed, and a working position in which the communication path between the train brake pipe connector 12 and the exhaust 19 is open, according to the pressure at the train brake pipe connector 12, the pressure at the control reservoir connector 14 and the pressure at the brake cylinder pipe connector 18.

As has just been described, the driver 39 is common to the cut-off valve 21 and to the quick service device 22.

This enables the pneumatic distributor valve assembly 10 to be particularly compact and economic.

Similarly, the driver 27 is common to the main device 20 and to the quick service device 22.

This also enables the pneumatic distributor valve assembly 10 to be particularly compact and economic.

A description will now be given of the resetting device 23.

The resetting device 23 is in fluidic connection with the control reservoir connector 14, the brake cylinder pipe connector 18, an exhaust to atmosphere 55 and a pocket 54, here internal to the distributor valve assembly 10.

The resetting device 23 is configured to selectively actuate a communication path between the pocket 54 and either the control reservoir connector 14 or the exhaust to atmosphere 55.

The resetting device 23 comprises a fluidic actuating member 56, below called reset actuating member The reset actuating member 56 is in fluidic connection with the control reservoir connector 14, the exhaust to atmosphere 55 and the pocket 54.

The reset actuating member 56 comprises a return spring 60 and has two operating positions, a resting position 58 and a working position 59.

When the reset actuating member 56 is in resting position 58, the communication path between the control reservoir connector 14 and the pocket 54 is open.

When the reset actuating member 56 is in working position 59, the communication path between the control reservoir connector 14 and the pocket 54 is closed whereas the communication path between the pocket 54 and the exhaust 55 is open.

The change of operating positions is actuated by the driver 39. The reset actuating member 56 is in resting position 58 when the driver 39 is in resting position that is to say when the pressure at the brake cylinder pipe connector 18 is atmospheric pressure. The reset actuating member 56 is in working position 59 when the driver 39 is in working position, that is to say when the pressure at the brake cylinder pipe connector 18 has become greater than atmospheric pressure.

The end of the rod 42 which can be seen at the bottom in FIG. 1 bears against the reset actuating member 56.

The return spring 60 of the reset actuating member 56 enables the latter to return to its resting position 58 when the driver 39 returns to its resting position, i.e. when the pressure at the brake cylinder pipe connector 18 is again equal to atmospheric pressure. The return spring 60 acts in the same direction as the return spring 57 of the driver 39.

The driver 39 and the reset member 56 confer upon the resetting device 23 a resting position in which the communication path between the control reservoir connector 14 and the pocket 54 is open, and a working position in which the communication path between the control reservoir connector 14 and the pocket 54 is closed whereas the communication path between the pocket 54 and the exhaust 55 is open; according to the pressure in the brake cylinder pipe connector 18.

As has just been described, the driver 39 is not only common to the cut-off valve 21 and to the quick service device 22, but also to the resetting device 23.

This also enables the pneumatic distributor valve assembly 10 to be particularly compact and economic.

In FIG. 1, the pneumatic distributor valve assembly 10 is in resting configuration.

The pneumatic distributor valve assembly 10 takes this configuration:
  when its different connectors are at atmospheric pressure (train stopped or emergency braking);
  when braking must not to be carried out (train brake pipe connector 12, control reservoir connector 14 and auxiliary reservoir connector 16 each at the same pressure whereas the brake cylinder pipe connector 18 is at atmospheric pressure); and
  when the pneumatic circuit of which the distributor valve assembly 10 forms part passes from a configuration in which it was at atmospheric pressure to a configuration at which the train brake pipe 11 passes to the reference pressure while the control reservoir 13 and the auxiliary reservoir 15 fill, which occurs when a train starts up.

The train brake pipe 11 is brought to a pressure of approximately 5 bars when it is filled.

The control reservoir 13 is filled by the train brake pipe 11, the communication path from the train brake pipe connector 12 to the control reservoir connector 14 being provided by the cut-off valve 21 which is in its resting position.

As can see in FIG. 2, the path from the train brake pipe connector 12 to the control reservoir connector 14 breaks down as follows: the air under pressure arrives from the train brake pipe 11 to the train brake pipe connector 12, passes via the actuating member 38 in resting position 45 and arrives at the control reservoir connector 14. The control reservoir 13 is brought to a pressure of approximately 5 bars.

The chamber 44 is at atmospheric pressure and thus the cut-off driver 39 is in resting position.

The auxiliary reservoir 15 is filled by compressed air supplied by the train brake pipe 11, passing by the communication path, between the connectors 12 and 16, comprising the check valve 9 (which path is illustrated solely in FIG. 1). The auxiliary reservoir 15 is brought to the pressure of approximately 5 bars.

The pressure present at the train brake pipe connector 12 is similar to the pressure at the control reservoir connector 14 since the train brake pipe 11 fills the control reservoir 13. Thus the chambers 30 and 31 of the main device 20 are brought to the same pressure of approximately 5 bars and thus the driver 27 remains in resting position.

The pocket 54 is filled by the train brake pipe 11 since the communication path from the train brake pipe connector 12 to the pocket 54 is open. The path is open because the cut-off valve 21 is in its resting position and the resetting device 23 is in its resting position.

The path from the train brake pipe connector 12 to the pocket 54 breaks down as follows: the air under pressure arrives from the train brake pipe 11 to the train brake pipe connector 12, passes by the actuating member 38 in resting position 45 then by the actuating member 56 in resting position 58 and arrives in the pocket 54. The pocket 54 is brought to the pressure of approximately 5 bars.

In resting position. the communication path between the train brake pipe connector 12 and the exhaust to atmosphere 19 is closed since the actuating member 25 is in resting position 33.

The higher must be the intensity of the braking the greater the reduction in the pressure to which the train brake pipe 11 is brought on braking of the train. The comparison between the new pressure to which the train brake pipe 11 is brought and the pressure of the control reservoir 13 enables that intensity to be known.

A reduction in the pressure in the chamber 31 of the driver 27 leads to an increase in the volume of the chamber 30 since the reference pressure of approximately 5 bars remains invariable in the reservoir 13, which drives the piston 28 and thus the rod 29 in translation towards the chamber 31, that is to say upward in the drawings.

Thus, the second quick service actuating member 25 passes into its working position 32. The train brake pipe connector 12 is in communication with the exhaust 19.

The reduction in the pressure in the train brake pipe 11 is greatly accentuated.

Furthermore, as the pressure at the brake cylinder pipe connector 18 is still atmospheric pressure, the cut-off valve 21 and the quick service actuating member 50 remain in resting position.

As the reduction in the pressure in the train brake pipe 11 is accentuated by the path between the train brake pipe connector 12 and the exhaust 19 which has opened, the difference in pressure between the chamber 30 and the chamber 31 increases. The main actuating member 26 passes to working position 35, opening the path between the auxiliary reservoir connector 16 and the brake cylinder pipe connector 18. The pressure at the brake cylinder pipe connector 18 becomes greater than atmospheric pressure.

Therefore, the cut-off driver 39 passes to its working position, the first quick service actuating member 50 passes to its working position 52 and the cut-off actuating member 38 passes to its working position 46.

Thus, the communication path between the train brake pipe connector 12 and the exhaust 19 closes; and the path between the train brake pipe connector 12 and the control reservoir connector 14 also closes.

Next, the reset actuating member 56 passes to its working position 59, which results in establishing a communication between the exhaust to atmosphere 55 and the pocket 54. The pocket 54 is brought to atmospheric pressure.

So long as the pressure at the train brake pipe connector 12 remains less than the pressure at the control reservoir connector 14, that is to say when braking must be carried out, the actuating members 25, 38, 50 and 56 remain in working position.

When the pressure in the train brake pipe 11 increases to end the braking, the pressure in the chamber 31 rises also since it is in continuous fluidic connection with the train brake pipe 11. Thus, the piston 28 of the driver 27 will progressively return to its initial position, aided by the return spring 48. The main actuating member 26 thus returns to its resting position 36.

At this stage, the pressure at the brake cylinder pipe connector 18 is not yet at atmospheric pressure since the communication path with the exhaust 19 has only just been established. The cut-off driver 39 is thus still in working position.

Therefore, the communication path between the train brake pipe connector 12 and the control reservoir connector 14 is still closed; and the communication path between the pocket 54 and the control reservoir connector 14 is still closed.

When the pressure at the brake cylinder pipe connector 18 is at atmospheric pressure, the cut-off driver 39 passes to its resting position and the reset actuating member 56 returns to its resting position 58.

On reestablishment of the connection between the reservoir 13 and the pocket 54, balancing of the pressures between those two containers takes place since part of the air under pressure in the reservoir 13, and what is more, in the chamber 30 of the main device 20, goes into the pocket 54 which makes the value of the pressure in the reservoir 13 drop. The pressure in the chamber 30 also reduces.

The drop in pressure in the control reservoir 13 enables the distributor valve assembly 10 to be reset faster since the pressure in the train brake pipe 11 takes less time to be similar to the pressure in the control reservoir 13, and therefore the main driver 27 takes less time to return to its resting position.

In the illustrated example, as regards the cut-off valve 21, the quick service device 22 and the resetting device 23:
    when braking must be carried out, the sequence of changes of positions of the actuating members is the following: it is first of all the second quick service actuating member 25 which passes from its resting position 33 to its working position 32 then it is the first quick service actuating member 50 which passes from its resting position 51 to its working position 52 then it is the cut-off actuating member 38 which passes from its resting position 45 to its working position 46 then it is the reset actuating member 56 which passes from its resting position 58 to its working position 59; and when braking must stop being carried out, the sequence of changes in positions of the actuating members is the following: it is first of all the reset actuating member 56 which passes from its working position 59 to its resting position 58 then it is the cut-off actuating member 38 which passes from its working position 46 to its resting position 45 then it is the second quick service actuating member 25 which passes from its working position 32 to its resting position 33 then it is the first quick service actuating member 50 which passes from its working position 52 to its resting position 51.

The sequence which has just been described is obtained by the appropriate choice of the travels of the pistons and the stiffnesses of the springs used to implement the cut-off valve 21, the quick service device 22 and the resetting device 23.

FIGS. 2 to 6, described later, show this sequencing in more detail than FIG. 1.

It should be noted that in the sequencing which has just been described, when braking must stop being carried out, the change in positions of the second quick service actuating member 25 occurs before the change in positions of the first quick service actuating member 50; and that it is important to comply with that order.

In the opposite case, that is to say if the first quick service actuating member 50 were to pass from its working position 52 to its resting position 51 while the second quick service actuating member 25 was still in its working position 32, the quick service device 22 would place the train brake pipe connector 12 in communication with the exhaust 19, which would drop the pressure at the train brake pipe connector 12 and would increase the intensity of the braking, that is to say exactly the contrary of the command conveyed by the train brake pipe to have the braking ended.

It should be noted that the constriction 7 provided on the link between the cut-off actuating member 38 and the control reservoir connector 14, between the branch going towards the main driver 27 and the branch going towards the reset actuating member 56, serves to limit the drop in pressure at the control reservoir connector 14 and in the chamber 30 when the pressure at the train brake pipe connector 12 drops (that is to say when braking must be carried out).

The delay in pressure drop at the control reservoir connector 14 and at the chamber 30 of the driver 27 enables the driver 27 to pass into working position, enables the pressure at the brake cylinder pipe connector 18 to rise, enables the cut-off driver 39 to pass into working position and enables the cut-off actuating member 38 to pass into working position 46.

The constriction 8 disposed between the brake cylinder pipe connector 18 and the cut-off driver 39 makes it possible to delay the time at which the driver 39 passes into working position relative to the time at which the pressure at the brake cylinder pipe connector 18 becomes greater than atmospheric pressure, in order for the time during which the train brake pipe connector 12 is placed in communication with the exhaust 19 to be sufficiently long.

The time of placing the train brake pipe connector 12 and the exhaust 19 in communication is also influenced by the length of the fluidic connection between the brake cylinder pipe connector 18 and the chamber 44 of the cut-off driver 39.

In the practical example of implementation illustrated in FIGS. 2 to 6, in order for the time of placing in communication to be sufficiently long, the brake cylinder pipe connector 18 and the chamber 44 are relatively far apart.

With reference to FIG. 2, which represents the distributor valve assembly 10 in its resting configuration as in FIG. 1, a description will now be given of how to provide a practical implementation of the fluidic actuating members, i.e. the main actuating member 26, the cut-off actuating member 38, the first quick service actuating member 50, the second quick service actuating member 25 and the reset actuating member 56.

The main actuating member 26 is implemented by three chamber 72, 73 and 74, the internal space of the rod 29 comprising an inlet opening 94 and an outlet opening 71, a piston 85, a piston 95, the spring 37 bearing on the piston 85 and disposed in the chamber 74, and a seat 84 delimiting a communication opening 75.

The chambers 72, 73 and 74 are successively disposed following on from the chambers 30 and 31, that is to say that the succession is the following: chamber 30 then chamber 31 then chamber 72 then chamber 73 then chamber 74.

The piston 95 is disposed between the chambers 72 and 73. Like the piston 28, it is joined to the rod 29.

The internal space of the rod 29 and the chamber 72 are at atmospheric pressure by the opening 71 and the exhaust 19, the chamber 73 is in fluidic connection with the brake cylinder pipe connector 18 and the chamber 74 is in fluidic connection with the auxiliary reservoir connector 16.

It is to be recalled here that between the auxiliary reservoir connector 16 and the main actuating member 26, there is a pressure reducing valve 97 which is not illustrated in FIGS. 2 to 6.

The cut-off actuating member 38 is implemented by two chambers 61 and 63, a piston 83, a seat 82 delimiting an opening for fluidic communication 62 and the return spring 47 bearing on the piston 83 and disposed in the chamber 61.

The chambers 61 and 63 are successively disposed following on from the chambers 43 and 44, that is to say that the succession is the following: chamber 43 then chamber 44 then chamber 63 then chamber 61.

The chamber 61 is in fluidic connection with the train brake pipe connector 12 and the chamber 63 is in fluidic connection with the control reservoir connector 14.

The first quick service actuating member 50 is implemented by the chamber 61, a chamber 65, a piston 88 joined to a solid rod 49, a seat 89 delimiting a communication opening 66 and the return spring 53 bearing on the piston 88 and disposed in the chamber 65.

The second quick service actuating member 25 is implemented by a chamber 68, the internal space of the rod 29 comprising an opening 70, a piston 90, a seat 91 situated at the end of a wall in which is provided communication opening 69, and the return spring 34 bearing on the piston 90 and disposed in the chamber 68.

The chamber 65 is contiguous with chamber 61, on the opposite side to the chamber 63. The chamber 68 is contiguous with chamber 30, on the opposite side to the chamber 31.

The chamber 65 of the first quick service actuating member 50 is in fluidic connection with the chamber 68 of the second quick service actuating member 25 by a communication opening 67. The internal space of the rod 29 is connected to atmosphere by the opening 71, the chamber 72 and the exhaust 19.

The reset actuating member 56 is implemented by a chamber 64, a chamber 92, the internal space of the rod 42 opening at one end by an opening 77 and at the other end by an opening 93, a piston 87, a seat 86 delimiting a communication opening 76 and the return spring 60 bearing on the piston 87 and disposed in the chamber 92.

The chamber 92 and 64 are successively disposed following on from the chambers 44 and 43, that is to say that the succession is the following: chamber 44 then chamber 43 then chamber 64 then chamber 92.

The chamber 64 is in fluidic connection with the pocket 54 and the chamber 92 is in fluidic connection with an exhaust to atmosphere 55.

It will be noted that the chambers 43, 44, 63, 61, 65 and 68 have substantially the same diameter and that chamber 74 also has substantially that same diameter.

It is also to be noted that the chambers 30, 31, 72 and 73 have substantially the same diameter, greater than that of chamber 74 or chamber 68.

It will furthermore be noted that chambers 64 and 92 have the same diameter which is smaller than the diameter of the chamber 43 and that they are in fact surrounded by the chamber 43, and moreover here by the spring 57.

Lastly it will be noted that the pocket 54 is situated, in the distributor valve assembly 10, between the outside wall of the chambers of intermediate diameter such as 43 and 44.

FIGS. 2 to 6 illustrate the distributor valve assembly 10 in different operating states.

FIG. 2 represents the distributor valve assembly 10 in its resting position as in FIG. 1. The distributor valve assembly 10 takes this resting position when no braking is carried out. The actuating members 26, 38, 50, 25 and 56 illustrated in FIG. 2 are in resting position 36, 45, 51, 33 and 58 respectively. The drivers 27 and 39 are thus also in resting position.

When the main actuating member 26 is in resting position 36, the rod 29 is away from the piston 85. As the spring 37 and the piston 85 are not biased by the rod 29, the spring 37 presses the piston 85 against the seat 84, thus obturating opening 75. The chamber 73 is isolated from the chamber 74. The fluidic communication path between the brake cylinder pipe connector 18 and the auxiliary reservoir connector 16 is in closed position.

As the rod 29 is remote from the piston 85, the opening 94 is open enabling fluidic communication between the chamber 73 and the internal space of the rod 29. The fluidic communication path between the brake cylinder pipe connector 18 and the exhaust 19 is in open position.

When the cut-off actuating member 38 is in resting position 45, the piston 83 is away from the seat 82 rendering the opening 62 open. The spring 47 is compressed. The chamber 61 is in fluidic communication with the chamber 63. The path between the train brake pipe connector 12 and the control reservoir connector 14 is in open position.

When the quick service device 22 is in resting position, the first and second actuating members 50 and 25 are in resting position 51 and 33 respectively.

When the first quick service actuating member 50 is in resting position 51, the piston 88 is away from the seat 89. The opening 66 is open and thus the chambers 61 and 65 are in fluidic communication. The piston 88 and the rod 49 are pushed away from the seat 89 by the rod 42 via the piston 83 of the cut-off actuating member 38. The spring 53 is compressed.

When the second quick service actuating member 25 is in resting position 33, the piston 90 is away from the seat 91. The opening 70 is closed since the rod 29 is in contact with the piston 90. The chamber 68 is isolated from the internal space of the rod 29. The piston 90 is pushed away from the seat 91 by the rod 29. The spring 34 is compressed.

Thus the communication path between the train brake pipe connector 12 and the exhaust to atmosphere 19 is in closed position.

When the reset actuating member 56 is in resting position 58, the rod 42 is away from the piston 87. The opening 93 is open placing in fluidic communication, via the internal space of the rod 42, the chamber 63 and the chamber 64. Furthermore the piston 87 rests on the seat 86 and is kept there by the spring 60. The opening 76 is closed by the piston 87. The communication path between the pocket 54 and the control reservoir connector 14 is in open position. The communication path between the pocket 54 and the exhaust 55 is in closed position.

FIG. 3 represents the distributor valve assembly 10 just after the pressure at the train brake pipe connector 12 has become less than the pressure at the control reservoir connector 14. Only the second quick service actuating member 25 has passed into its working position 32. Indeed in this phase, the path between the train brake pipe connector 12 and the atmosphere 19 has passed into open position (and no longer in closed position as in FIGS. 1 and 2).

The rod 29 is no longer in contact with the piston 90. The piston 90, by the return spring 34, is held on the seat 91. As the rod 29 is away from the piston 90, the opening 70 is open and, thanks to the opening 69 and the chamber 68, the train brake pipe connector 12 is in fluidic communication with the internal space of the rod 29, and thus with the exhaust 19 via the opening 71 and the chamber 72.

FIG. 4 represents the distributor valve assembly 10 in a configuration that it then takes. After the second quick service actuating member 25, the main actuating member 26, the first quick service actuating member 50 and the cut-off actuating member 38 have passed into their working positions 35, 52 and 46 respectively.

The rod 29 pushes the piston 85 and the spring 37 goes into a compressed position. The piston 85 is away from the seat 84 rendering the opening 75 open. The chamber 73 is in fluidic communication with the chamber 74. The fluidic communication path between the brake cylinder pipe connector 18 and the auxiliary reservoir connector 16 is in open position. The pressure at the brake cylinder pipe connector 18 is greater than atmospheric pressure.

As the rod 29 is in contact with the piston 85, the opening 94 is closed eliminating the fluidic communication between the exhaust 19 (via the chamber 72) and the chamber 73. The fluidic communication path between the brake cylinder pipe connector 18 and the exhaust to atmosphere 19 is in closed position.

The rod 42 no longer pushes either the piston 83 or the rod 49 and the piston 88. The spring 53 pushes the piston 88 onto the seat 89, the opening 66 being closed. The communication path between the train brake pipe connector 12 and the atmosphere 19 is in closed position.

The spring 47 pushes the piston 83 onto the seat 82. The opening 62 is thus obturated by the piston 83. The chamber 61 and 63 are no longer in fluidic communication. The path between the train brake pipe connector 12 and the control reservoir connector 14 is in closed position.

The reset actuating member 56 is in an intermediate operating position, at mid-travel between its resting position 58 and its working position 59. Indeed, the communication path between the control reservoir connector 14 and the pocket 54 is in closed position but the communication path between the pocket 54 and the exhaust to atmosphere 55 is also in closed position.

This intermediate position results from the fact that the communication path between the auxiliary reservoir connector 16 and the brake cylinder pipe connector 18 has just passed into open position and that the pressure in the chamber 44 is not sufficient to counter the force exerted by the spring 60 on the piston 87 and the force exerted by the spring 57 on the piston 41.

FIG. 5 represents the distributor valve assembly 10 in a configuration it takes when braking is being carried out and the pressure at the train brake pipe connector 12 is stable.

The reset actuating member 56 is in its working position 59.

The pressure in the chamber 44 has become sufficient for the rod 42 to push the piston 87 away from the seat 86 rendering the opening 76 open. The springs 57 and 60 are compressed. The rod 42 is thus in contact with the piston 87 which renders the opening 93 closed. Thus the communication path between the control reservoir connector 14 and the pocket 54 is in closed position and the communication path between the pocket 54 and the exhaust 55 is in open position.

The main actuating member 26 is in an intermediate position at mid-travel between its resting position 35 and its working position 36. This position is conjointly due to the pressure at the train brake pipe connector 12 and thus in the chamber 31, due to the force generated by the pressure at the brake cylinder pipe connector 18 and thus in the chamber 73 and due to the return spring 48 on the piston 95. Thus, the communication path between the auxiliary reservoir connector 16 and the brake cylinder pipe connector 18 is in closed position and the communication path between the brake cylinder pipe connector 18 and the exhaust 19 is in closed position.

Indeed, the overall force generated by the pressure in the chamber 31 on the piston 28 but also by the pressure in the chamber 73 and the spring 48 on the piston 95 is not sufficient to place the rod 29 away from the piston 85

It should be noted that the piston 95 serves to implement the feedback loop 96 of the main actuating member 26.

FIG. 6 represents the distributor valve assembly 10 just after the pressure at the train brake pipe connector 12 has become similar once again to the pressure at the control reservoir connector 14.

The main actuating member 26 has passed into its resting position 35.

Thus the communication path between the brake cylinder pipe connector 18 and the atmosphere 19 is in open position since the rod 29 is away from the piston 85 due to the force generated by the pressure in the chamber 31 and by the return spring 48.

The reset actuating member 56 is in its resting position 58 since the pressure in the chamber 44 is equal to the pressure in the chamber 43 i.e. atmospheric pressure. The communication path between the control reservoir connector 14 and the pocket 54 is in open position.

Next, the distributor valve assembly 10 returns to its resting position illustrated in FIG. 2.

In the example illustrated in FIGS. 2 to 6, the portion implementing the first quick service actuating member 50, the cut-off actuating member 38, the cut-off driver 39 and the reset actuating member 56 (portion comprising the succession of chambers 65, 61, 63, 44, 43, 64 and 92) is contiguous and aligned with the portion implementing the second quick service actuating member 25, the main driver 27 and the main actuating member 26 (portion comprising the succession of chamber 68, 30, 31, 72, 73 and 74).

In a variant not illustrated, these two portions are differently disposed relative to each other, for example being at a distance with a fluidic connection replacing the opening 67.

In another variant not illustrated, the wall in which is provided the opening 67 is eliminated (the chambers 65 and 68 are replaced by a single chamber) and the springs 34 and 53 are replaced by a single spring.

In the illustrated example, the rod 42 of the cut-off driver 39 bears on the cut-off actuating member 38 which itself bears on the first quick service actuating member 50.

In a variant not illustrated, the portion of the rod 42 which can be seen at the top in FIG. 1 is replaced by a forked portion, that is to say with two ends, one of the ends bearing on the cut-off actuating member such as 38 and the other end on the first quick service actuating member such as 50. Of course, in this variant, the travels between the pistons and the seats enabling the fluidic actuating members 38 and 50 to be implemented are chosen to comply with the sequence of changes of positions referred to above.

As a variant, the sequencing of position changing is different, for example the second quick service actuating member 25 being the first to change position when braking must cease being carried out.

In the example illustrated in the drawings, the main driver 27 is common to the main device 20 and to the quick service device 22.

In a variant not illustrated, a specific driver is provided for the main member 26 and another driver is provided for the second quick service actuating member 25.

In the illustrated example, the check valve 9, the pocket 54 and the pressure reducing valve 97 form part of the distributor valve assembly 10.

In variants not illustrated, the pocket 54, the pressure reducing valve 97 and/or the check valve 9 do not form part of the distributor valve assembly 10 and are thus provided externally thereof.

In other variants not illustrated, the pressure reducing valve 97 is replaced by a pressure limiter; the auxiliary reservoir 15 is supplied by compressed air not by the train brake pipe 11 but by a main pipe of which the pressure is for example of the order of 9 bars; and/or the proportionality ratio k is different from the aforementioned value of the order of 2.53, for example being of the order of 2.67 (4/1.5) for a brake cylinder pipe in which the maximum pressure is 4 bars rather than 3.8 bars.

In a variant not illustrated, the cut-off valve 21 is sensitive not only to the pressure at the brake cylinder pipe connector 18, but also to the difference between the pressure at the control reservoir connector 14 and the pressure at the train brake pipe connector 12 whereas a locking valve of the quick service device is provided as described in French patent application 2 731 192.

In a variant not illustrated, the pocket 54 is replaced by another air evacuating member, for example an exhaust to atmosphere combined with an actuating member to selectively actuate a communication path between that exhaust and the reset actuating member 56, between an open position and a closed position, said path being in closed position when the pressure at the brake cylinder pipe connector 18 is atmospheric pressure, and in open position when the pressure at the brake cylinder pipe connector 18 is greater than atmospheric pressure. The reset actuating member 56 then comprises only two openings, the opening in communication with the exhaust to atmosphere 55 being eliminated, the position 58 corresponding to the open position of the path between the control reservoir connector 14 and air evacuating member (and more specifically the actuating member thereof) replacing the pocket 54, the position 59 corresponding to the closed position of that path. The actuating member of the air evacuating member is configured (in particular by its travel and the power of its return spring) to react more rapidly than the reset actuating member 56 when the pressure at the brake cylinder pipe connector 18 becomes greater than atmospheric pressure (braking to be carried out), and on the contrary to react less rapidly than the reset actuating member 56 when the pressure at the brake cylinder pipe connector 18 becomes close to atmospheric pressure (braking to cease). Thus, when braking is being carried out, the path of the reset actuating member 56 is closed and the path of the actuating member of the air evacuating member is open. At the end of braking, when the pressure at the brake cylinder pipe connector 18 becomes close to atmospheric pressure, the reset actuating member 56 changes position first with its path passing from the closed position to the open position. As the path of the actuating member of the air evacuation member is still open, the control reservoir connector 14 is in communication with the exhaust of the air evacuation member, such that the air from the control reservoir 13 evacuates by that exhaust. Next, when the actuating member of the air evacuating member reacts in turn, its path passes into closed position and thus the evacuation of the air from the control reservoir 13 ceases. Similarly, at the start of braking, due to the difference in reaction speed, the path between the control reservoir connector 14 and the exhaust of the air evacuating member is briefly open. To drive the actuating member of the air evacuating member, the driver 39 or a different driver may be used. To avoid evacuating too much air, the exhaust of the air evacuating member may comprise a constriction such as 7 or 8.

In a variant not illustrated, the quick service device 22 is in fluidic connection with an air evacuation member other than the exhaust to atmosphere 19, for example a pocket such as pocket 54. The quick service actuating member 25 then comprises a third opening, in fluidic connection with an exhaust to atmosphere, and in the resting position 33 the pocket replacing the exhaust to atmosphere 19 is in fluidic communication with the exhaust to atmosphere connected to the third opening.

In a variant not illustrated, a resetting device such as the device 23 is not provided.

It should be noted more generally that the invention is not limited to the examples described and represented.

The invention claimed is:

1. A Pneumatic brake distributor valve assembly for a rail vehicle, comprising:
   a brake cylinder pipe connector (18) to connect to a brake cylinder pipe (17) provided to be linked to a braking device configured to provide braking of an intensity according to the pressure in the brake cylinder pipe (17), braking having not to be carried out when the pressure in the brake cylinder pipe (17) is atmospheric pressure, braking having to be carried out when the pressure in the brake cylinder pipe (17) is greater than atmospheric pressure;
   a train brake pipe connector (12) to connect to a train brake pipe (11) provided to be brought to a pressure of which the difference relative to a reference pressure represents the intensity of braking to perform, braking having not to be carried out when the pressure in the train brake pipe (11) is similar to said reference pressure, braking having to be carried out when the pressure in the train brake pipe (11) is less than said reference pressure;
   a control reservoir connector (14) to connect to a control reservoir (13) provided to be brought to said reference pressure;
   an auxiliary reservoir connector (16) to connect to an auxiliary reservoir (15) provided to store compressed air;
   a main device (20) in fluidic connection with said brake cylinder pipe connector (18), said train brake pipe connector (12), said control reservoir connector (14), said auxiliary reservoir connector (16) and an exhaust to atmosphere (19), said main device (20) being configured to selectively actuate a communication path between said brake cylinder pipe connector (18) and either said exhaust (19) or said auxiliary reservoir connector (16), according to the pressure at said train brake pipe connector (12) and the pressure at said control reservoir connector (14), in order for the pressure at the brake cylinder pipe connector (18) to be k times the difference between the pressure at the control reservoir connector (14) and the pressure at the train brake pipe connector (12), k being a pre-set ratio of proportionality;
   a cut-off valve (21) in fluidic connection with said brake cylinder pipe connector (18), said train brake pipe connector (12) and said control reservoir connector (14), said cut-off valve (21) being configured to selectively actuate a communication path between said train brake pipe connector (12) and said control reservoir connector (14), between a closed position and an open position, said path being in open position when the pressure at said brake cylinder pipe connector (18) is atmospheric pressure and in closed position when the pressure at said brake cylinder pipe connector (18) is greater than atmospheric pressure; and
   a quick service device (22) in fluidic connection with said brake cylinder pipe connector (18), said train brake pipe connector (12), said control reservoir connector (14) and an air evacuating member (19), said quick service device (22) being configured to selectively actuate a communication path between said train brake pipe connector (12) and said air evacuating member (19), between a closed position and an open position, said path being in open position when the pressure at said train brake pipe connector (12) becomes less than the pressure at said control reservoir connector (14) while the pressure at said brake cylinder pipe connector (18) is still at atmospheric pressure, said path otherwise being in closed position;
   wherein said distributor valve assembly (10) comprises a driver (39) common to said cut-off valve (21) and to said quick service device (22), in fluidic connection with said brake cylinder pipe connector (18), said common driver (39) being configured to actuate both said communication path of said quick service device (22) and said communication path of said cut-off valve (21).

2. A distributor valve assembly according to claim 1, wherein said quick service device (22) comprises a first fluidic actuating member (50), below called first quick service actuating member, a second fluidic actuating member (25), below called second quick service actuating member, said common driver (39) and another driver (27);
   said first quick service actuating member (50) being in fluidic connection with said train brake pipe connector (12) and said second quick service actuating member (25), and having a resting position in which said train brake pipe connector (12) is in fluidic communication with said second quick service actuating member (25) and a working position in which said train brake pipe connector (12) is isolated from said second quick service actuating member (25), said common driver (39) leaving said first quick service actuating member (50) in its resting position when the pressure at said brake cylinder pipe connector (18) is atmospheric pressure and driving said first quick service actuating member (50) into its working position when the pressure at said brake cylinder pipe connector (18) is greater than atmospheric pressure;

said second quick service actuating member (25) being in fluidic connection with said first quick service actuating member (50) and said air evacuating member (19), said second quick service actuating member (25) having a resting position in which said first quick service actuating member (50) is isolated from said air evacuating member (19) and a working position in which said first quick service actuating member (50) is in fluidic communication with said air evacuating member (19), said other driver (27) leaving said second quick service actuating member (25) in its resting position when the pressure at said train brake pipe connector (12) is equal to the pressure at said control reservoir connector (14) and driving said second quick service actuating member (25) into its working position when the pressure at said train brake pipe connector (12) is less than the pressure at said control reservoir (14).

3. A distributor valve assembly according to claim 2, wherein said cut-off actuating member (38) is implemented by a first chamber (61) in fluidic connection with the train brake pipe connector (12), by a second chamber (63) in fluidic connection with the control reservoir connector (14), by a cut-off seat (82) delimiting an opening for fluidic communication (62) between the first chamber (61) and the second chamber (63), by a cut-off actuating piston (83) movable between a position in which it is away from said cut-off seat (82) and a position in which it is in contact with said cut-off seat (82) and closes said opening for fluidic communication (62) between the first chamber (61) and the second chamber (63), as well as by a return spring (47) biasing said cut-off actuating piston (83) towards said cut-off seat (82).

4. A distributor valve assembly according to claim 3, wherein said first quick service actuating member (50) is implemented by said first chamber (61), by a third chamber (65), that is contiguous with said first chamber (61), on the opposite side to the second chamber (63), by a first quick service actuating member seat (89) delimiting an opening for fluidic communication (66) between the first chamber (61) and the third chamber (65), by a first quick service actuating member piston (88) which is movable between a position in which it is away from said first quick service actuating member seat (89) and a position in which it is in contact with said first quick service actuating member seat (89) and closes said opening for fluidic communication (66) between the first chamber (61) and the third chamber (65), by a return spring (53) biasing said first quick service actuating member piston (88) towards said first quick service actuating member seat (89), as well as by a rod (49) joined to said first quick service actuating member piston (88), which rod is configured for the first quick service actuating member piston (88) and said rod (49) to be pushed away from the first quick service actuating member seat (89) by the cut-off actuating piston (83) when it is away from said cut-off seat (82).

5. A distributor valve assembly according to claim 4, wherein said common driver (39) is implemented by a fourth chamber (44) in fluidic connection with said brake cylinder pipe connector (18), said fourth chamber (44) being contiguous with said second chamber (63), on the opposite side to said first chamber (61), by a fifth chamber (43) at atmospheric pressure, by a common driver piston (41) comprising a face turned towards said fourth chamber (44) and, on the opposite side, a face turned towards the fifth chamber (43), by a return spring (57) biasing said common driver piston (41) towards said fourth chamber (44), as well as by a rod (42) joined to said common driver piston (41), said rod (42) joined to the common driver piston (41) pushing said cut-off actuating piston (83) in said position in which it is away from the cut-off seat (82) when the pressure at said brake cylinder pipe connector (18) is atmospheric pressure, said rod (42) joined to the common driver piston (41) letting said cut-off actuating piston (83) come into contact with the cut-off seat (82) when the pressure at said brake cylinder pipe connector (18) is greater than atmospheric pressure.

6. A distributor valve assembly according to claim 3, wherein said common driver (39) is implemented by a fourth chamber (44) in fluidic connection with said brake cylinder pipe connector (18), said fourth chamber (44) being contiguous with said second chamber (63), on the opposite side to said first chamber (61), by a fifth chamber (43) at atmospheric pressure, by a common driver piston (41) comprising a face turned towards said fourth chamber (44) and, on the opposite side, a face turned towards the fifth chamber (43), by a return spring (57) biasing said common driver piston (41) towards said fourth chamber (44), as well as by a rod (42) joined to said common driver piston (41), said rod (42) joined to the common driver piston (41) pushing said cut-off actuating piston (83) in said position in which it is away from the cut-off seat (82) when the pressure at said brake cylinder pipe connector (18) is atmospheric pressure, said rod (42) joined to the common driver piston (41) letting said cut-off actuating piston (83) come into contact with the cut-off seat (82) when the pressure at said brake cylinder pipe connector (18) is greater than atmospheric pressure.

7. A distributor valve assembly according to claim 2, wherein said other driver (27) is common to said quick service device (22) and to said main device (20), said other common driver (27) being configured to actuate both said communication path of said quick service device (22) and said communication path of the main device (20).

8. A distributor valve assembly according to claim 7, wherein said assembly is configured such that, when braking is required to stop being carried out, the second quick service actuating member (25) passes from its working position (32) to its resting position (33) before the first quick service actuating member (50) passes from its working position (52) to its resting position (51).

9. A distributor valve assembly according to claim 7, wherein said cut-off actuating member (38) is implemented by a first chamber (61) in fluidic connection with the train brake pipe connector (12), by a second chamber (63) in fluidic connection with the control reservoir connector (14), by a cut-off seat (82) delimiting an opening for fluidic communication (62) between the first chamber (61) and the second chamber (63), by a cut-off actuating piston (83) movable between a position in which it is away from said cut-off seat (82) and a position in which it is in contact with said cut-off seat (82) and closes said opening for fluidic communication (62) between the first chamber (61) and the second chamber (63), as well as by a return spring (47) biasing said cut-off actuating piston (83) towards said cut-off seat (82).

10. A distributor valve assembly according to claim 2, wherein said assembly is configured such that, when braking is required to stop being carried out, the second quick service actuating member (25) passes from its working position (32) to its resting position (33) before the first quick service actuating member (50) passes from its working position (52) to its resting position (51).

11. A distributor valve assembly according to claim 10, wherein said cut-off actuating member (38) is implemented by a first chamber (61) in fluidic connection with the train brake pipe connector (12), by a second chamber (63) in fluidic connection with the control reservoir connector (14), by a cut-off seat (82) delimiting an opening for fluidic communication (62) between the first chamber (61) and the second chamber (63), by a cut-off actuating piston (83) movable between a position in which it is away from said cut-off seat (82) and a position in which it is in contact with said cut-off seat (82) and closes said opening for fluidic communication (62) between the first chamber (61) and the second chamber (63), as well as by a return spring (47) biasing said cut-off actuating piston (83) towards said cut-off seat (82).

12. A distributor valve assembly according to claim 1, wherein said cut-off valve (21) comprises said common driver (39) and a fluidic actuating member (38), called cut-off actuating member below, in fluidic connection with said train brake pipe connector (12) and said control reservoir connector (14), said cut-off actuating member (38) having a resting position in which it opens said communication path between the train brake pipe connector (12) and the control reservoir connector (14), and having a working position in which it closes said communication path between the train brake pipe connector (12) and the control reservoir connector (14), said common driver (39) leaving said cut-off actuating member (38) in its resting position when the pressure at said brake cylinder pipe connector (18) is atmospheric pressure and driving said cut-off actuating member (38) into its working position when the pressure at said brake cylinder pipe connector (18) is greater than atmospheric pressure.

13. A distributor valve assembly according to claim 12, wherein said cut-off valve (21) comprises exclusively said common driver (39) and said cut-off actuating member (38).

14. A distributor valve assembly according to claim 1, wherein said air evacuating member (19) with which said quick service device (22) is in fluidic connection is an exhaust to atmosphere (19).

15. A distributor valve assembly according to claim 14, wherein said exhaust to atmosphere (19) with which the quick service device (22) is in connection is also the exhaust to atmosphere (19) with which the main device (20) is in fluidic connection.

16. A distributor valve assembly according to claim 1, further comprising a constriction (8) between said brake cylinder pipe connector (18) and said common driver (39).

* * * * *